(12) United States Patent  
Asai et al.

(10) Patent No.: US 9,728,794 B2  
(45) Date of Patent: Aug. 8, 2017

(54) FUEL CELL SYSTEM

(71) Applicant: NISSAN MOTOR CO., LTD., Kanagawa (JP)

(72) Inventors: Yoshitomo Asai, Yokohama (JP); Hiroshi Takeda, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 94 days.

(21) Appl. No.: 14/381,049

(22) PCT Filed: Feb. 28, 2013

(86) PCT No.: PCT/JP2013/055347
§ 371 (c)(1),
(2) Date: Aug. 26, 2014

(87) PCT Pub. No.: WO2013/129552
PCT Pub. Date: Sep. 6, 2013

(65) Prior Publication Data
US 2015/0037701 A1    Feb. 5, 2015

(30) Foreign Application Priority Data

Feb. 29, 2012 (JP) .................. 2012-043873
Mar. 1, 2012 (JP) .................. 2012-045739
Jan. 24, 2013 (JP) .................. 2013-011415

(51) Int. Cl.
*H01M 8/04* (2016.01)
*H01M 8/24* (2016.01)
(Continued)

(52) U.S. Cl.
CPC ...... *H01M 8/04111* (2013.01); *H01M 8/0438* (2013.01); *H01M 8/04089* (2013.01);
(Continued)

(58) Field of Classification Search
CPC ........... H01M 8/04111; H01M 8/0438; H01M 8/04425; H01M 8/04776; H01M 8/2465;
(Continued)

(56) References Cited

U.S. PATENT DOCUMENTS

2006/0144450 A1* 7/2006 Hasegawa ........... F16K 11/0525  
137/625.46  
2010/0316926 A1* 12/2010 Ishikawa ........... H01M 8/04201  
429/444

FOREIGN PATENT DOCUMENTS

JP       H02254260 A     10/1990  
JP       2007257956 A    10/2007  
(Continued)

OTHER PUBLICATIONS

Gyan Stepper Motor Theory of Operation online Wayback web date Dec. 18, 2006; {http://gyan.fragnel.ac.in/~dileep/stepperworking.pdf}.*

*Primary Examiner* — Patrick Ryan  
*Assistant Examiner* — Aaron Greso  
(74) *Attorney, Agent, or Firm* — Young Basile Hanlon & MacFarlane, P.C.

(57) ABSTRACT

A fuel cell system is configured to: calculate a target stack supply flow rate; calculate a compressor supply flow rate based on a stack supply flow rate and the target stack supply flow rate; set a larger one of the compressor supply flow rate and a lower limit flow rate, determined depending on an operation state of the fuel cell system, as a target compressor supply flow rate; control a bypass valve based on the stack supply flow rate and the target stack supply flow rate; fix the bypass valve when the stack supply flow rate is in a predetermined bypass valve fixing range, and the stack supply flow rate becomes less than the target stack supply flow rate; and release the fixation of the bypass valve when (Continued)

the target compressor supply flow rate becomes more than the lower limit flow rate after the bypass valve is fixed.

6 Claims, 9 Drawing Sheets

(51) Int. Cl.
H01M 8/04111 (2016.01)
H01M 8/04089 (2016.01)
H01M 8/0438 (2016.01)
H01M 8/04746 (2016.01)
H01M 8/2465 (2016.01)

(52) U.S. Cl.
CPC ... *H01M 8/04395* (2013.01); *H01M 8/04425* (2013.01); *H01M 8/04746* (2013.01); *H01M 8/04753* (2013.01); *H01M 8/04776* (2013.01); *H01M 8/2465* (2013.01); *H01M 2250/20* (2013.01)

(58) Field of Classification Search
CPC ......... H01M 8/04746; H01M 8/04089; H01M 8/0475; H01M 2250/20; H01M 8/04; H01M 8/24; Y02E 60/50
See application file for complete search history.

(56) References Cited

FOREIGN PATENT DOCUMENTS

| JP | 2009-076243 | A | 4/2009 | |
| JP | 2009-123550 | * | 6/2009 | ............. H01M 8/04 |
| JP | 2009-123550 | A | 6/2009 | |
| JP | 2010-272375 | * | 6/2009 | ............. H01M 8/04 |
| WO | WO 2008/078553 | * | 2/2011 | ............. H01M 8/04 |

* cited by examiner

FUEL CELL SYSTEM

CROSS REFERENCE TO RELATED APPLICATIONS

The present application claims priority to Japanese Patent Applications Nos. 2012-43873, filed on Feb. 29, 2012; 2012-45739, filed on Mar. 1, 2012, and 2013-11415, filed on Jan. 24, 2013, each incorporated herein in its entirety.

TECHNICAL FIELD

This invention relates to a fuel cell system.

BACKGROUND

In JP 2009-123550 A, there is disclosed a related-art fuel cell system for controlling a flow rate (actual stack supply flow rate) of a cathode gas supplied to a fuel cell stack to reach a target stack supply flow rate set depending on an electric power request by discharging an unnecessary part of a cathode gas for electric power generation in the fuel cell stack out of the cathode gas discharged from a cathode compressor to a cathode gas discharge passage via a bypass passage.

SUMMARY

The related-art fuel cell system controls an opening degree of a bypass valve provided on the bypass passage based on the actual stack supply flow rate and the target stack supply flow rate so that the actual stack supply flow rate reaches the target stack supply flow rate.

In the fuel cell system for carrying out this control, particularly when an opening degree resolution of the bypass valve is rough, the actual stack supply flow rate cannot be controlled to reach the target stack supply flow rate, and the opening/closing of the bypass valve repeats in the vicinity of the target stack supply flow rate in some cases. In such case, when the bypass valve is a stepping motor, it is concerned that noise is generated. In view of this, it is conceivable to fix the bypass valve when the actual stack supply flow rate reaches in the vicinity of the target stack supply flow rate in order to prevent the bypass valve from opening/closing in this way.

However, if the bypass valve is fixed when the actual stack supply flow rate is more than the target stack supply flow rate, the cathode gas whose flow rate is more than that required for the power generation is supplied to the fuel cell stack, and it is concerned that electrolyte membranes are dried.

On the other hand, if the bypass valve is fixed when the actual stack supply flow rate is less than the target stack supply flow rate, the cathode gas whose flow rate is required for the power generation is not supplied to the fuel cell stack, and it is concerned that the voltage drops.

Further, if the bypass valve is fixed when the actual stack supply flow rate reaches in the vicinity of the target stack supply flow rate (falls within a bypass valve fixing range), for example, even when the target stack supply flow rate increases and a state where the bypass valve can be closed is brought about, the actual stack supply flow rate may be controlled to stay in the vicinity of the target stack supply flow rate and the bypass valve may remain fixed, and a surplus cathode gas may be supplied by the cathode compressor. Then, a power consumption of the cathode compressor increases, and it is concerned that a fuel efficiency degrades.

This invention has been made in view of those problems, and has an object to provide a fuel cell system capable of restraining the above-mentioned inconvenience.

An aspect of this invention is applied to a fuel cell system using a bypass method for a cathode gas by means of a compressor, and controls the compressor and controls a bypass valve in the following way.

First, in compressor control, based on a detected actual stack supply flow rate and a target stack supply flow rate calculated based on a request from a fuel cell stack, a compressor supply flow rate requested by stack for controlling the actual stack supply flow rate to reach the target stack supply flow rate is calculated. Then, a larger one of the compressor supply flow rate requested by stack and a lower limit flow rate, which is determined depending on an operation state of the fuel cell system, is set as a target compressor supply flow rate, and the compressor is controlled so as to reach the set target compressor supply flow rate.

On the other hand, in bypass valve control, the bypass valve is controlled based on the detected actual stack supply flow rate and the target stack supply flow rate calculated based on the request from the fuel cell stack so as to control the actual stack supply flow rate to reach the target stack supply flow rate.

In the aspect of this invention including the compressor control and the bypass valve control, the bypass valve is fixed when the actual stack supply flow rate falls within a predetermined bypass valve fixing range having the target stack supply flow rate as a reference, and the actual stack supply flow rate becomes less than the target stack supply flow rate. Then, after the bypass valve is fixed in this way, when the target compressor supply flow rate becomes more than the lower limit flow rate, the fixation of the bypass valve is released.

A detailed description is given below of an embodiment of this invention and advantages of this invention referring to the accompanying drawings.

DESCRIPTION OF EMBODIMENT

A fuel cell generates electric power by sandwiching an electrolyte membrane between an anode electrode (fuel electrode) and a cathode electrode (oxidizing agent electrode), supplying the anode electrode with an anode gas (fuel gas) containing hydrogen, and supplying the cathode electrode with a cathode gas (oxidizing agent gas) containing oxygen. Electrode reactions progressing on both the anode electrode and the cathode electrode are as follows.

Anode electrode: $2H_2 \rightarrow 4H^+ + 4e^-$ (1)

Cathode electrode: $4H^+ + 4e^- + O_2 \rightarrow 2H_2O$ (2)

As a result of the electrode reactions represented as (1) and (2), the fuel cell generates an electromotive force of approximately one volt.

When the fuel cell is used as a power source for an automobile, required electric power is large, and the fuel cells are thus used as a fuel cell stack constructed by stacking some hundreds of fuel cells. Then, a fuel cell system for supplying the fuel cell stack with the anode gas and the cathode gas is constructed to extract the electric power for driving a vehicle.

Figure 1:
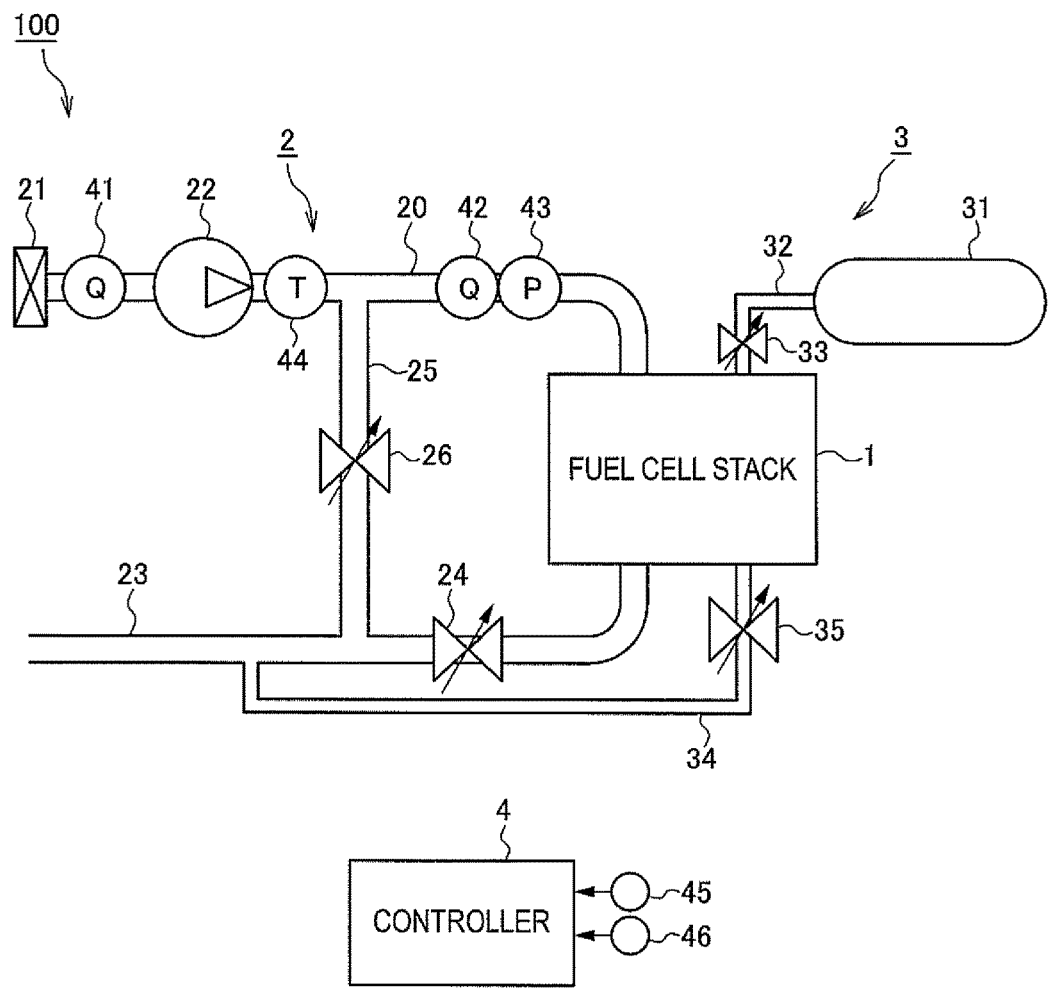
FIG. 1 is a schematic diagram of a fuel cell system according to an embodiment of this invention.

FIG. 1 is a schematic diagram of a fuel cell system 100 according to an embodiment of this invention.

The fuel cell system 100 includes a fuel cell stack 1, a cathode gas supply/discharge apparatus 2, an anode gas supply/discharge apparatus 3, and a controller 4.

The fuel cell stack 1 is constructed by stacking some hundreds of the fuel cells, and receives supplies of the anode gas and the cathode gas to generate the electric power required to drive the vehicle.

The cathode gas supply/discharge apparatus 2 supplies the fuel cell stack 1 with the cathode gas, and discharges a cathode off-gas discharged from the fuel cell stack 1 to the outside air. The cathode gas supply/discharge apparatus 2 includes a cathode gas supply passage 20, a filter 21, a cathode compressor 22, a cathode gas discharge passage 23, a cathode pressure regulating valve 24, a bypass passage 25, a bypass valve 26, a first flow rate sensor 41, a second flow rate sensor 42, a pressure sensor 43, and a temperature sensor 44.

The cathode gas supply passage 20 is a passage through which the cathode gas to be supplied to the fuel cell stack 1 flows. The cathode gas supply passage 20 is connected, at one end, to the filter 21, and is connected, at the other end, to a cathode gas inlet port of the fuel cell stack 1.

The filter 21 removes foreign substances in the cathode gas to be taken into the cathode gas supply passage 20.

The cathode compressor 22 is provided in the cathode gas supply passage 20. The cathode compressor 22 takes the air (outside air) as the cathode gas via the filer 21 into the cathode gas supply passage 20, and supplies the fuel cell stack 1 with the air.

The cathode gas discharge passage 23 is a passage through which the cathode off-gas discharged from the fuel cell stack 1 flows. The cathode gas discharge passage 23 is connected, at one end, to a cathode gas outlet port of the fuel cell stack 1, and forms an opening end at the other end.

The cathode pressure regulating valve 24 is provided in the cathode gas discharge passage 23. The cathode pressure regulating valve 24 is controlled to open/close by the controller 4, and adjusts a pressure of the cathode gas supplied to the fuel cell stack 1 to a desired pressure.

The bypass passage 25 is a passage for directly discharging a part of the cathode gas discharged from the cathode compressor 22 to the cathode gas discharge passage 23 without routing through the fuel cell stack 1 depending on necessity. The bypass passage 25 is connected, at one end, to the cathode gas supply passage 20 downstream of the cathode compressor 22, and, at the other end, to the cathode gas discharge passage 23 downstream of the cathode pressure regulating valve 24.

The bypass valve 26 is a switching valve having an opening degree changing stepwise by a unit opening degree at a time, and is provided in the bypass passage 25. The bypass valve 26 is controlled to open/close by the controller 4, and adjusts a flow rate (hereinafter referred to as "bypass flow rate") of the cathode gas flowing through the bypass passage 25.

The first flow rate sensor 41 is provided in the cathode gas supply passage 20 upstream of the cathode compressor 22. The first flow rate sensor 41 detects a flow rate (hereinafter referred to as "compressor supply flow rate") of the cathode gas supplied to (taken into) the cathode compressor 22.

The second flow rate sensor 42 is provided in the cathode supply flow passage 20 downstream of a connection portion to the bypass passage 26, namely, in the cathode supply passage 20 in a neighborhood of the cathode gas inlet port of the fuel cell stack 1. The second flow rate sensor 42 detects a flow rate (hereinafter referred to as "stack supply flow rate") of the cathode gas supplied to the fuel cell stack 1.

The pressure sensor 43 is provided in the cathode supply flow passage 20 downstream of the connection portion to the bypass passage 26, namely, in the cathode supply passage 20 in the neighborhood of the cathode gas inlet port of the fuel cell stack 1. The pressure sensor 43 detects an inlet pressure (hereinafter referred to as "stack inlet pressure") of the fuel cell stack 1.

The temperature sensor 44 is provided in the cathode gas supply passage 20 in a neighborhood of a discharge side of the cathode compressor 22. The temperature sensor 44 detects the temperature (referred to as "intake air temperature") of the cathode gas discharged from the cathode compressor 22.

The anode gas supply/discharge apparatus 3 supplies the fuel cell stack 1 with the anode gas, and discharges an anode off-gas discharged from the fuel cell stack 1 to the cathode gas discharge passage 23. The anode gas supply/discharge apparatus 3 includes a high-pressure tank 31, an anode gas supply passage 32, an anode pressure regulating valve 33, an anode gas discharge passage 34, and a purge valve 35.

The high pressure tank 31 stores the anode gas to be supplied to the fuel cell stack 1 while the anode gas is maintained in a high pressure state.

The anode gas supply passage 32 is a passage for supplying the fuel cell stack 1 with the anode gas discharged from the high pressure tank 31. The anode gas supply passage 32 is connected, at one end, to the high pressure tank 31, and is connected, at the other end, to an anode gas inlet port of the fuel cell stack 1.

The anode pressure regulating valve 33 is provided in the anode gas supply passage 32. The anode pressure regulating valve 33 is controlled to open/close by the controller 4, and adjusts a pressure of the anode gas supplied to the fuel cell stack 1 to a desired pressure.

The anode gas discharge passage 34 is a passage through which the anode off-gas discharged from the fuel cell stack 1 flows. The anode gas discharge passage 34 is connected, at one end, to an anode gas outlet port of the fuel cell stack 1, and is connected, at the other end, to the cathode gas discharge passage 23.

The anode off-gas discharged to the cathode gas discharge passage 23 via the anode gas discharge passage 34 is mixed with the cathode off-gas and the cathode gas, which has flown through the bypass passage 25, in the cathode gas discharge passage 23, and is discharged to the outside of the fuel cell system 100. The anode off-gas contains a surplus anode gas (hydrogen) which has not been used for the electrode reaction, and the anode gas is thus mixed with the cathode off-gas and the cathode gas and the mixed gas is discharged to the outside of the fuel cell system 100 in this way, thereby reducing the hydrogen density of the discharged gas to a predetermined density or less.

The purge valve 35 is provided in the anode off-gas discharge passage 34. The purge valve 35 is controlled to open/close by the controller 4, and controls the flow rate of the anode off-gas discharged from the anode gas discharge passage 34 to the cathode gas discharge passage 23.

The controller 4 is constructed by a microcomputer including a central processing unit (CPU), a read-only memory (ROM), a random access memory (RAM), and an input/output interface (I/O interface). The controller 4 inputs signals from various types of sensors including the first flow rate sensor 41, the second flow rate sensor 42, the pressure sensor 43, and the temperature sensor 44 as well as a sensor 45 for detecting the depression amount (hereinafter referred to as "accelerator operation amount") of an accelerator pedal, an atmospheric pressure sensor 46 for detecting the atmospheric pressure, and the like.

The controller 4 applies feedback control to the cathode compressor 22 and the bypass valve 26 based on those input signals so that the following two requests are simultaneously satisfied. Those two requests include a request (hereinafter referred to as "dilution request") to reduce the hydrogen density of the discharged gas discharged to the outside of the fuel cell system 100 to the predetermined density or less and a request (hereinafter referred to as "power generation request") to generate electric power (hereinafter referred to as "requested generated power") requested by respective electric components, such as drive motors, of the fuel cell system 100 in the fuel cell stack 1.

Figure 2:
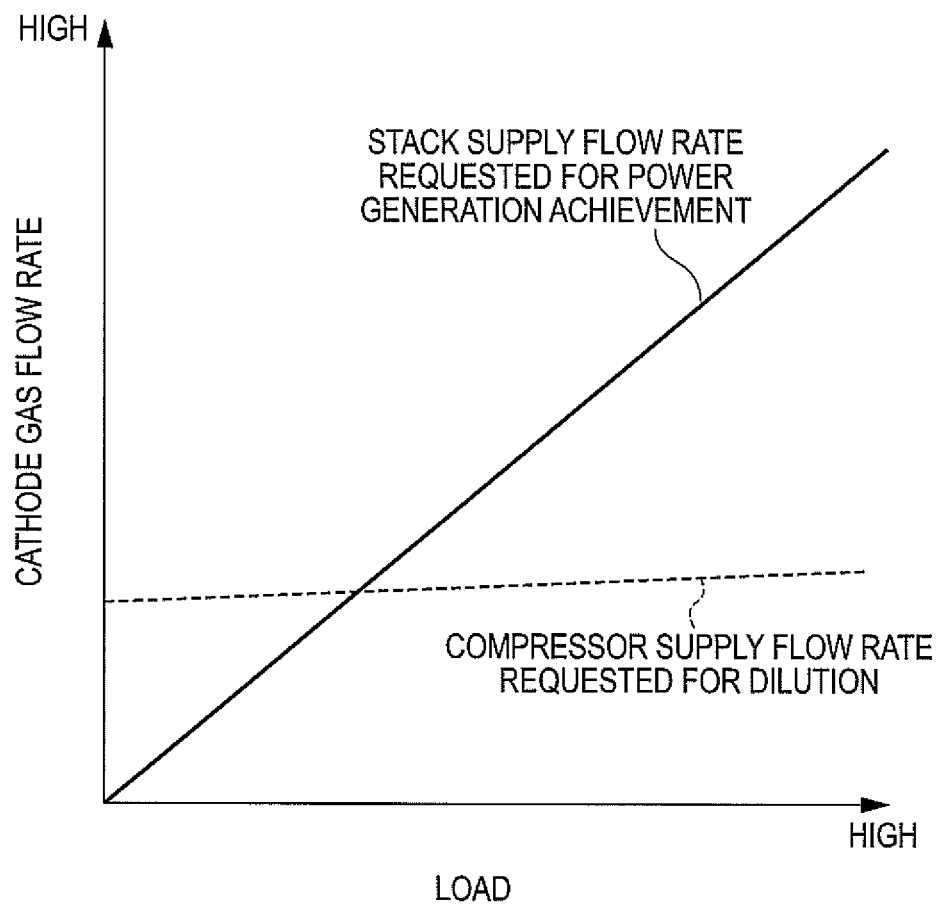
FIG. 2 is a graph showing a relationship between a compressor supply flow rate requested for dilution and a stack supply flow rate requested for power generation achievement depending on a load on a fuel cell stack.

FIG. 2 is a graph showing a relationship between a compressor supply flow rate (hereinafter referred to as "compressor supply flow rate requested for dilution") required to reduce the hydrogen density of the discharged gas discharged to the outside of the fuel cell system 100 to the predetermined density or less, and a stack supply flow rate (hereinafter referred to as "stack supply flow rate requested for power generation achievement") required to generate the requested generated power depending on a load (namely, the requested generated power) on the fuel cell stack 1.

As shown in FIG. 2, the stack supply flow rate requested for power generation achievement is more than the dilution request compressor supply flow rate in a medium/high load area.

Thus, when the feedback control is applied to the cathode compressor 22 while a target value (hereinafter referred to as "compressor supply flow rate requested by stack") of the compressor supply flow rate for controlling the stack supply flow rate to reach the stack supply flow rate requested for power generation achievement is simply considered as a target compressor supply flow rate in the medium load area, the flow rate of the cathode gas supplied to the fuel cell stack 1 reaches the stack supply flow rate requested for power generation achievement, and the requested generated power can thus be generated by the fuel cell stack 1. Then, the cathode off-gas discharged from the fuel cell stack 1 can be used to dilute the anode off-gas flowing from the anode gas discharge passage 34 to the cathode gas discharge passage 23 so that the hydrogen density of the discharge gas is equal to or less than the predetermined density.

On the other hand, as shown in FIG. 2, the compressor supply flow rate requested for dilution is more than the stack supply flow rate requested for power generation achievement in a low load area.

Thus, when, in order to reduce the hydrogen density of the discharged gas to the predetermined density or less in the low load area, the feedback control is applied to the cathode compressor 22 while the compressor supply flow rate requested for dilution is considered as the target compressor supply flow rate, thereby supplying the cathode gas in more than the flow rate required for generating the requested generated power in the fuel cell stack 1 by the cathode compressor 22, a surplus cathode gas not required for the power generation is supplied to the fuel cell stack 1. As a result, the electrolyte membrane of each of the fuel cells constructing the fuel cell stack 1 is dried, resulting in a possible decrease in the power generation efficiency of the fuel cell stack 1.

Therefore, when the compressor supply flow rate requested for dilution is more than the compressor supply flow rate requested by stack, the feedback control needs to be applied to the cathode compressor 22 while the compressor supply flow rate requested for dilution is considered as the target compressor supply flow rate, and, simultaneously, the bypass valve 26 needs to be opened to flow the surplus cathode gas unnecessary for the power generation through the bypass passage 25. In other words, the bypass valve 26 needs to be opened so that the bypass flow rate reaches a target bypass flow rate acquired by subtracting a stack supply flow rate requested for power generation (a target value of the stack supply flow rate when the stack supply flow rate is controlled to reach the stack supply flow rate requested for power generation achievement) from the compressor supply flow rate requested for dilution.

By the way, in this embodiment, the opening degree of the bypass valve 26 can be increased only stepwise by the unit opening degree at a time. Therefore, the bypass flow rate may not be controlled to match the target bypass flow rate. Then, the bypass valve 26 is repeatedly opened/closed in order that the bypass flow rate matches the target bypass flow rate, resulting in an upward/downward fluctuation of the bypass flow rate around the target bypass flow rate. As a result, the compressor supply flow rate varies upward/downward, resulting in a rotational fluctuation in the cathode compressor, and such a problem that noise may be generated from the cathode compressor was experienced.

Figure 7:
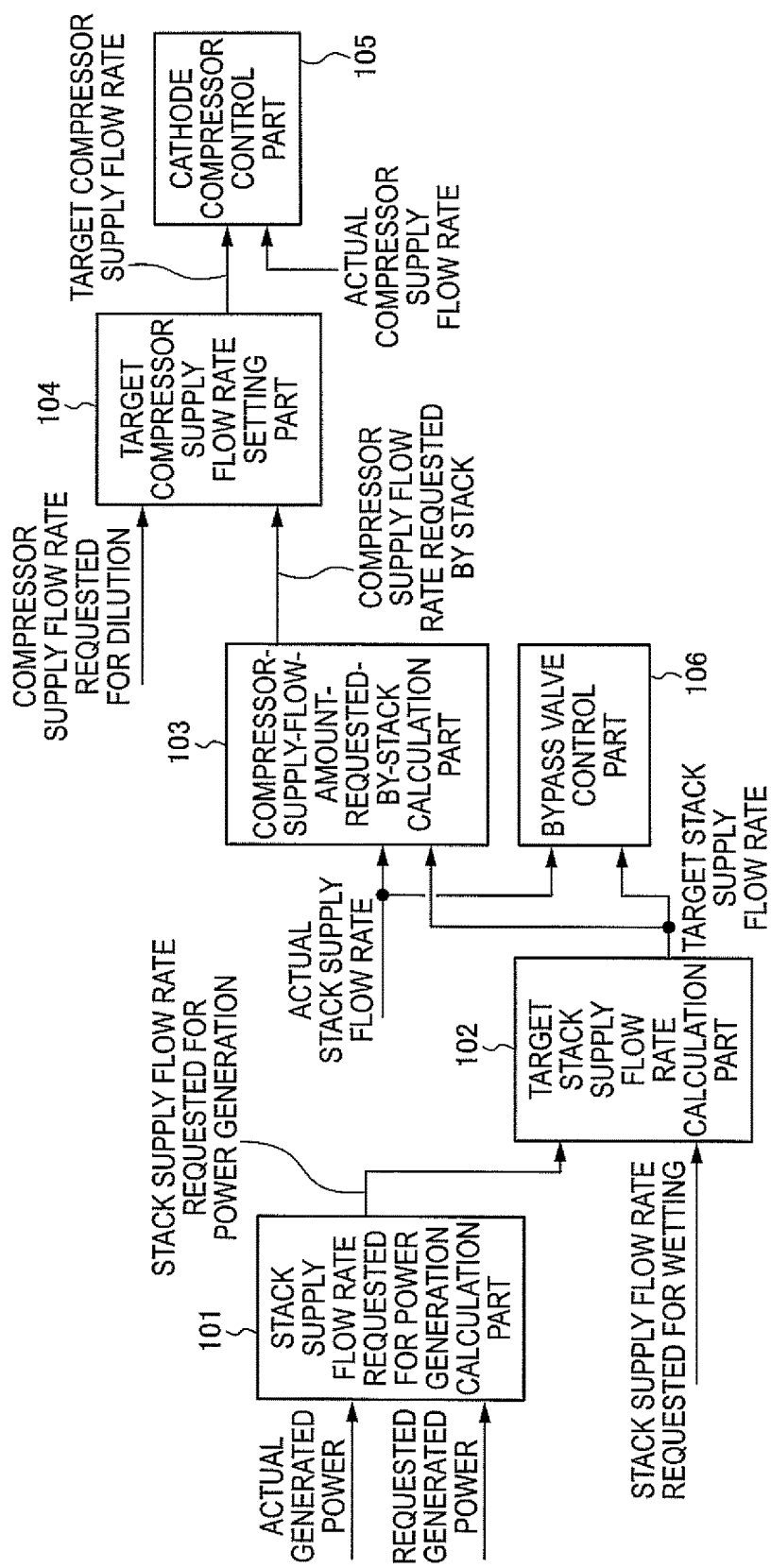
FIG. 7 is a diagram illustrating control blocks of a cathode system according to a comparative example.

Referring to FIG. 7, a description is first given of control for a cathode system according to a comparative example in order to promote understanding of this invention before a description is given of control for the cathode system according to this embodiment. Then, referring to FIG. 8, a description is given of a cause for the problem generated in the control for the cathode system according to the comparative example.

FIG. 7 is a diagram illustrating control blocks of the cathode system according to the comparative example.

The control blocks of the cathode system according to the comparative example includes a stack supply flow rate requested for power generation calculation part 101, a target stack supply flow rate setting part 102, a compressor-supply-flow-amount-requested-by-stack calculation part 103, a target compressor supply flow rate setting part 104, a cathode compressor control part 105, and a bypass valve control part 106.

The actual generated power of the fuel cell stack 1 and the requested generated power set depending on the load on the fuel cell stack 1 are input to the stack supply flow rate requested for power generation calculation part 101. The stack supply flow rate requested for power generation calculation part 101 sets a stack supply flow rate required to control the actual generated power to reach the requested generated power as the stack supply flow rate requested for power generation achievement, and calculates a target value to be used when the stack supply flow rate is changed toward the set stack supply flow rate requested for power generation achievement as the stack supply flow rate requested for power generation.

The stack supply flow rate requested for power generation and a stack supply flow rate requested for wetting are input to the target stack supply flow rate setting part 102. On this occasion, the stack supply flow rate requested for wetting is a stack supply flow rate required for controlling the wettability (moisture content) of the electrolyte membranes to achieve an optimal wettability (requested wettability) depending on the load on the fuel cell stack 1. The target stack supply flow rate setting part 102 sets a larger one of the stack supply flow rate requested for power generation and the stack supply flow rate requested for wetting as the target stack supply flow rate. In this way, the target stack supply flow rate setting part 102 sets the optimal stack supply flow rate depending on the load on the fuel cell stack 1 as the target stack supply flow rate.

The stack supply flow rate (hereinafter referred to as "actual stack supply flow rate") detected by the second flow rate sensor 42 and the target stack supply flow rate are input to the compressor-supply-flow-amount-requested-by-stack calculation part 103. The compressor-supply-flow-amount-requested-by-stack calculation part 103 calculates a target value of the compressor supply flow rate to change the actual stack supply flow rate toward the target stack supply flow rate as the compressor supply flow rate requested by stack based on a difference between the target stack flow rate and the actual stack flow rate. Specifically, the compressor-supply-flow-amount-requested-by-stack calculation part 103 carries out PI control depending on a component proportional to the difference between the target stack flow rate and the actual stack flow rate and a component acquired by integrating the difference between the target stack flow rate and the actual stack flow rate with respect to time, thereby calculating the compressor supply flow rate requested by stack.

When the compressor supply flow rate requested by stack as a manipulated value is saturated to a lower limit value, in order to prevent a vibration (so-called windup phenomenon) caused by excessive integral operation, the compressor-supply-flow-amount-requested-by-stack calculation part 103 carries out PI control of carrying out only integration operation which increases the compressor supply flow rate requested by stack above the lower limit value, and stopping integration operation which decreases the compressor supply flow rate requested by stack below the lower limit value.

The compressor supply flow rate requested for dilution determined depending on the load on the fuel cell stack 1 and the compressor supply flow rate requested by stack are input to the target compressor supply flow rate setting part 104. The target compressor supply flow rate setting part 104 sets a larger one of the compressor supply flow rate requested for dilution and the compressor supply flow rate requested by stack as the target compressor supply flow rate.

In this way, the target compressor supply flow rate setting part 104 sets a larger one of the compressor supply flow rate requested for dilution and the compressor supply flow rate requested by stack as the target compressor supply flow rate. Thus, the state where the compressor supply flow rate requested for dilution is set as the target compressor supply flow rate is equivalent to the state where the compressor supply flow rate requested by stack as a manipulated value is saturated to the lower limit value (on this occasion, compressor supply flow rate requested for dilution) for the compressor-supply-flow-amount-requested-by-stack calculation part 103.

Therefore, if the compressor supply flow rate requested for dilution is set as the target compressor supply flow rate in the target compressor supply flow rate setting part 104, the integration operation of decreasing the compressor supply flow rate requested by stack below the compressor supply flow rate requested for dilution is stopped in the compressor-supply-flow-amount-requested-by-stack calculation part 103.

In other words, if the compressor supply flow rate requested for dilution is set as the target compressor supply flow rate in the target compressor supply flow rate setting part 104, only when the actual stack supply flow rate is less than the target stack supply flow rate (only when the compressor supply flow rate requested by stack needs to be increased), the time integration of the difference between the target stack supply flow rate and the actual stack supply flow rate is carried out in the compressor-supply-flow-amount-requested-by-stack calculation part 103. Then, when the actual stack supply flow rate is more than the target stack supply flow rate (when the compressor supply flow rate requested by stack needs to be reduced), the time integration of the difference between the target stack supply flow rate and the actual stack supply flow rate is stopped.

The compressor supply flow rate (hereinafter referred to as "actual compressor supply flow rate") detected by the first flow rate sensor 41 and the target compressor supply flow rate are input to the cathode compressor control part 105. The cathode compressor control part 105 outputs a control signal directed to the cathode compressor 22 based on the difference between the target compressor supply flow rate and the actual compressor supply flow rate so that the actual compressor supply flow rate reaches the target compressor supply flow rate. Specifically, the cathode compressor control part 105 carries out PI control depending on a component proportional to the difference between the target compressor supply flow rate and the actual compressor supply flow rate and a component acquired by integrating the difference between the target compressor supply flow rate and the actual compressor supply flow rate with respect to time, thereby outputting the control signal directed to the cathode compressor 22.

The actual stack supply flow rate and the target stack supply flow rate are input to the bypass valve control part 106. The bypass valve control part 106 outputs a drive signal for the bypass valve 26 based on the difference between the target stack flow rate and the actual stack flow rate. Specifically, the bypass valve control part 106 carries out PI control depending on a component proportional to the difference between the target stack flow rate and the actual stack flow rate and a component acquired by integrating the difference between the target stack flow rate and the actual stack flow rate with respect to time, thereby calculating a bypass valve operation amount, and outputs a drive signal for the bypass valve 26 when the bypass valve operation amount exceeds a predetermined amount.

Figure 8:
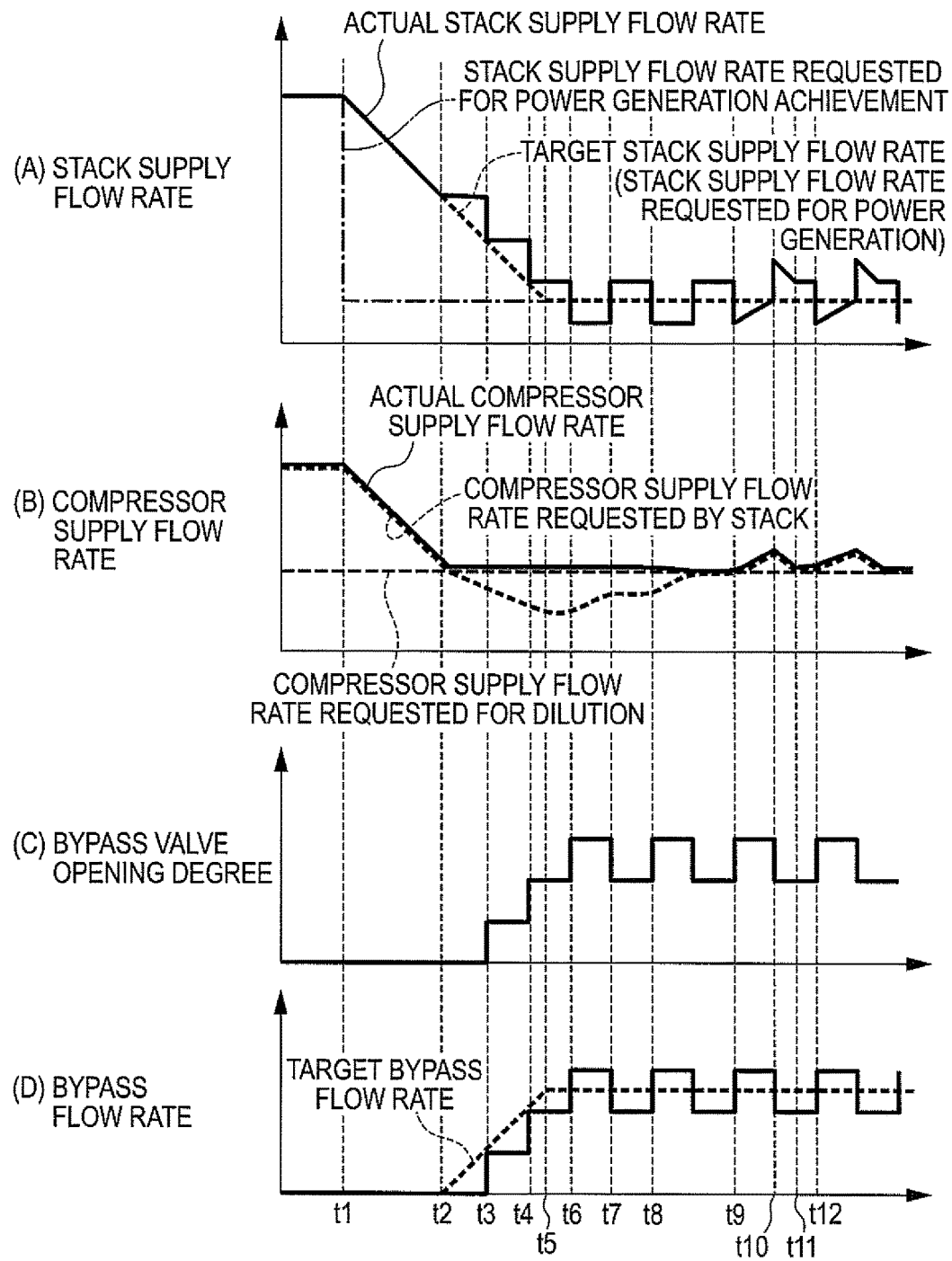
FIG. 8 are time charts illustrating an operation of control for the cathode system according to the comparative example.

On this occasion, in this embodiment, as described above, the opening degree of the bypass valve 26 can be increased only stepwise by the unit opening degree at a time. Therefore, in the control for the cathode system according to the comparative example, when the compressor supply flow rate requested for dilution is set as the target compressor supply flow rate, the bypass flow rate may not be controlled to match the target bypass flow rate, and the actual stack supply flow rate may not be controlled to match the target stack supply flow rate. Referring to FIG. 8, a description is now given of the problem generated in this case.

FIG. 8 are diagrams illustrating the problem generated when the bypass flow rate cannot be controlled to match the target bypass flow rate, and are time charts illustrating an operation of the control for the cathode system according to the comparative example.

At a time t1, for example, when the accelerator operation amount decreases, the requested generated power decreases, and the stack supply flow rate requested for power generation achievement decreases, the target stack supply flow rate (stack supply flow rate requested for power generation) decreases toward the stack supply flow rate requested for power generation achievement (FIG. 8(A)). As a result, the actual stack supply flow rate exceeds the target stack supply flow rate, and the compressor supply flow rate requested by stack calculated by the compressor-supply-flow-amount-requested-by-stack calculation part 103 thus also decreases (FIG. 8(B)). On this occasion, a description is given while it is assumed that that the stack supply flow rate requested for power generation is more than the stack supply flow rate requested for wetting.

The compressor supply flow rate requested by stack is more than the compressor supply flow rate requested for dilution from the time t1 to a time t2, and the compressor supply flow rate requested by stack is thus set as the target compressor supply flow rate (FIG. 8(B)). As a result, the responsive cathode compressor is controlled so as to control the actual compressor supply flow rate to reach the compressor supply flow rate requested by stack, and the actual stack supply flow rate thus decreases approximately following the target stack supply flow rate (FIG. 8(A)).

At the time t2, when the compressor supply flow rate requested by stack decreases below the compressor supply flow rate requested for dilution, the compressor supply flow rate requested for dilution is set as the target compressor supply flow rate, and the cathode compressor is controlled so that the actual compressor supply flow rate reaches the compressor supply flow rate requested for dilution (FIG. 8(B)). As a result, the actual stack supply flow rate does not decrease following the target stack supply flow rate, and becomes constant (FIG. 8(A)). Then, the target stack supply flow rate is decreased even after the time t2, and the actual stack supply flow rate thus gradually increases above the target stack supply flow rate, and the difference between the target stack supply flow rate and the actual stack supply flow rate gradually increases (FIG. 8(A)).

As the difference between the target stack supply flow rate and the actual stack supply flow rate gradually increases in this way, the bypass valve operation amount calculated by the PI control of the bypass valve control part 106 gradually increases. In the following description, when a distinction is particularly necessary, a bypass valve operation amount calculated when the actual stack supply flow rate is more than the target stack supply flow rate is referred to as "open side bypass valve operation amount", and a bypass valve operation amount calculated when the actual stack supply flow rate is less than the target stack supply flow rate is referred to as "close side bypass valve operation amount".

At a time t3, when the open side bypass valve operation amount exceeds a predetermined amount, the drive signal for the bypass valve 26 is output, and the bypass valve 26 is opened by the unit opening degree (FIG. 8(C)). As a result, the surplus cathode gas supplied to the fuel cell stack 1 flows into the bypass passage 25, the actual stack supply flow rate decreases to the target stack supply flow rate (FIG. 8(A)), and the bypass flow rate increases to a target bypass flow rate (=(compressor supply flow rate requested for dilution)−(target stack supply flow rate)) (FIG. 8(D)).

However, the target stack supply flow rate decreases even after the time t3, and the actual stack supply flow rate thus again gradually increases above the target stack supply flow rate (FIG. 8(A)), and the bypass valve 26 is further opened by the unit opening degree at a time t4 (FIG. 8(C). As a result, the actual stack supply flow rate again decreases to the target stack supply flow rate (FIG. 8(A)), and the bypass flow-amount increases to the target bypass flow rate (FIG. 8(D)).

When the stack supply flow rate requested for power generation decreases to the stack supply flow rate requested for power generation achievement at a time t5, and the target stack supply flow rate becomes constant, the difference between the target stack supply flow rate and the actual stack supply flow rate subsequently becomes constant (FIG. 8(A)). The compressor supply flow rate requested for dilution is set as the target compressor supply flow rate, and the actual stack supply flow rate is more than the target stack supply flow rate at the time t5, and the PI control of the compressor-supply-flow-amount-requested-by-stack calculation part 103 thus stops the calculation of the time integration of the deviation. Therefore, the compressor supply flow rate requested by stack becomes constant as a result of the state where the difference between the target stack supply flow rate and the actual stack supply flow rate becomes constant at the time t5 (FIG. 8(B)).

On the other hand, the PI control of the bypass valve control part 106 carries out the calculation of the time integration of the deviation, and the open side bypass valve operation amount calculated by the PI control of the bypass valve control part 106 thus increases even after the time t5.

When the open side bypass valve operation amount exceeds the predetermined amount at a time t6, the drive signal for the bypass valve 26 is output, and the bypass valve 26 is further opened by the unit opening degree (FIG. 8(C)). However, but the actual stack supply flow rate now cannot be controlled to reach the target stack supply flow rate, and the actual stack supply flow rate decreases below the target stack supply flow rate (FIG. 8(A)). In other words, the bypass flow rate cannot be controlled to reach the target bypass flow rate, and the bypass flow rate exceeds the target bypass flow rate (FIG. 8(D)). As a result, the PI control of the bypass valve control part 106 now gradually increases the close side bypass valve operation amount.

Moreover, when the bypass valve 26 is opened by the unit opening degree at the time t6, and the actual stack supply flow rate decreases below the target stack supply flow rate, the PI control of the compressor-supply-flow-amount-requested-by-stack calculation part 103 resumes the calculation of the time integration of the deviation. As a result, the compressor supply flow rate requested by stack increases (FIG. 8(B)).

When the close side bypass valve operation amount exceeds the predetermined amount at a time t7, the drive signal for the bypass valve 26 is output, and the bypass valve 26 is now closed by the unit opening degree (FIG. 8(C)), and the actual stack supply flow rate becomes more than the target stack supply flow rate again (FIG. 8(A)).

Moreover, when the bypass valve 26 is closed by the unit opening degree at the time t7, the actual stack supply flow rate again becomes more than the target stack supply flow rate again, and the compressor-supply-flow-amount-requested-by-stack calculation part 103 thus stops the calculation of the time integration of the deviation, and the compressor supply flow rate requested by stack becomes constant (FIG. 8(B)). Then, when the bypass valve 26 is opened by the unit opening degree at a time t8, and the actual stack supply flow rate becomes less than the target stack supply flow rate, the calculation of the time integration of the deviation is again carried out, and the compressor supply flow rate requested by stack increases (FIG. 8(B)).

As described above, the opening/closing of the bypass valve 26 repeats after the time t6, and the compressor supply flow rate requested by stack gradually increases.

Then, when the bypass valve 26 is opened by the unit opening degree at a time t9, the actual stack supply flow rate decreases below the target stack supply flow rate (FIG. 8(A)), and the compressor supply flow rate requested by the stack thus increases (FIG. 8(B)). As a result, the compressor supply flow rate requested by stack increases above the compressor supply flow rate requested for dilution (FIG. 8(B)), and the compressor supply flow rate requested by stack is set as the target compressor supply flow rate, and the actual compressor supply flow rate increases (FIG. 8(B)).

When the bypass valve 26 is closed by the unit opening degree at a time t10, the actual stack supply flow rate increases accordingly. As a result, the actual stack supply flow rate increases above the target stack supply flow rate (FIG. 8(A)), and the compressor supply flow rate requested by stack now decreases (FIG. 8(B)).

Then, when the compressor supply flow rate requested by stack decreases to the compressor supply flow rate requested for dilution at a time t11 (FIG. 8(B)), the cathode compressor is controlled so that the actual compressor supply flow rate reaches the compressor supply flow rate requested for dilution, and the actual compressor supply flow rate becomes constant (FIG. 8(B)). The actual stack supply flow rate is more than the target stack supply flow rate from the time t11 to a time t12 (FIG. 8(A)), and the calculation of the time integration of the deviation by the compressor-supply-flow-amount-requested-by-stack calculation part 103 thus stops. Thus, the compressor supply flow rate requested by stack also remains constant at the compressor supply flow rate requested for dilution (FIG. 8(B)).

When the bypass valve 26 is then opened by the unit opening degree at the time t12 (FIG. 8(C)), the compressor supply flow rate requested by stack again increases above the compressor supply flow rate requested for dilution (FIG. 8(B)), and the compressor supply flow rate requested by stack is set as the target compressor supply flow rate, and the actual compressor supply flow rate increases (FIG. 8(B)).

As described above, as a result of the repetition of the closing/opening of the bypass valve 26, the actual compressor supply flow rate finally fluctuates upward/downward as in the state after the time t9, the fluctuation occurs in the rotation of the cathode compressor 22, and the noise is generated from the cathode compressor 22.

On this occasion, as a method of preventing the bypass valve 26 from repeating the closing/opening, for example, a method of inhibiting the drive of the bypass valve 26, thereby fixing the bypass valve 26 when the difference between the actual stack supply flow rate and the target stack supply flow rate is equal to or less than a predetermined value, namely, in a state where the actual stack supply flow rate becomes less than the target stack supply flow rate if the bypass valve 26 is opened, is conceivable.

Figure 9:
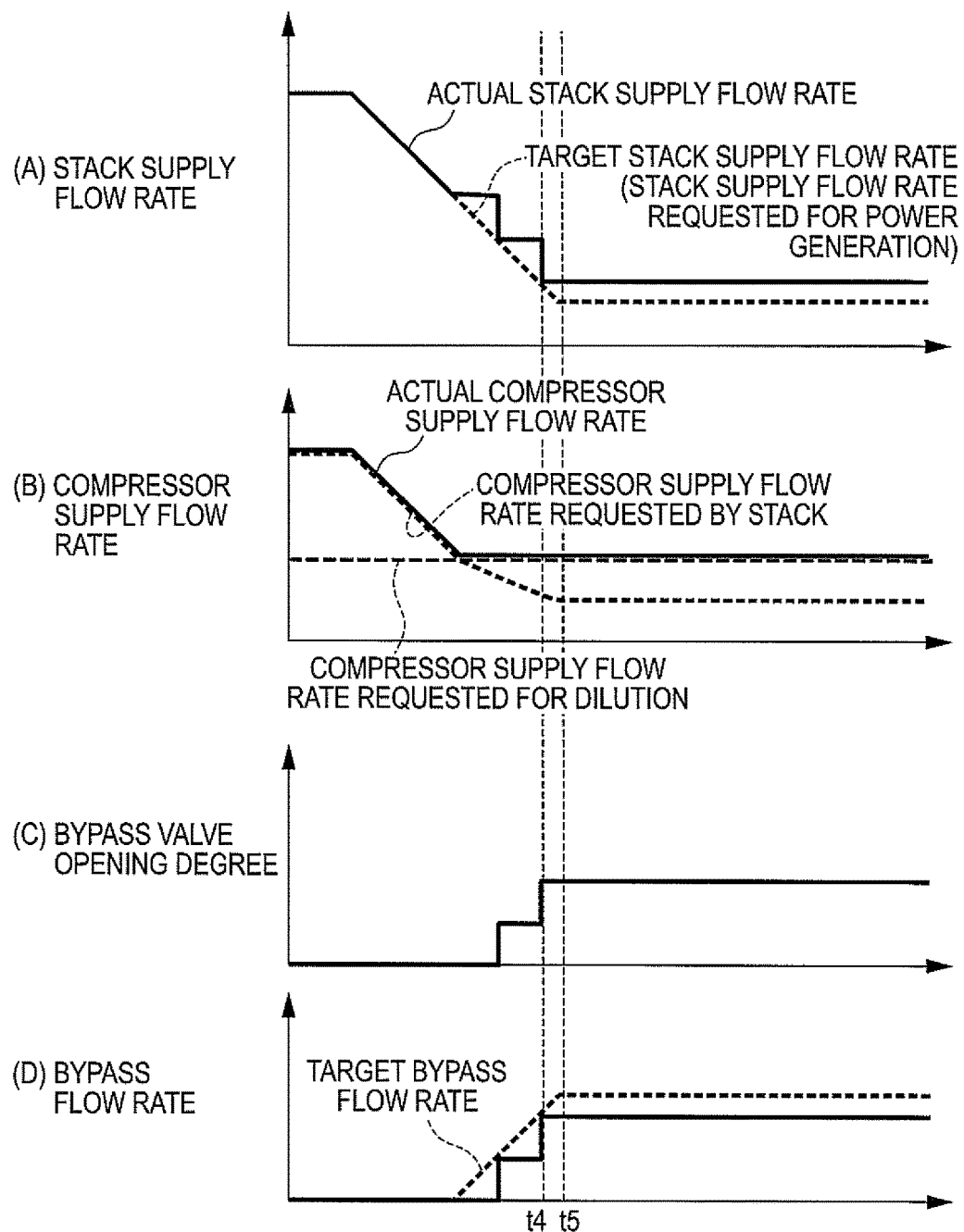
FIG. 9 are time charts illustrating an operation performed when the bypass valve is inhibited from being driven in a state where an actual stack supply flow rate decreases below a target stack supply flow rate if the bypass valve is opened in the control for the cathode system according to the comparative example.

However, the method can prevent the bypass valve 26 from repeating the opening/closing, but the actual stack supply flow rate may not be controlled to reach the target stack supply flow rate. Referring to FIG. 9, a description is now given of the problem.

FIG. 9 are time charts illustrating an operation performed when the drive of the bypass valve 26 is inhibited in the state where the actual stack supply flow rate decreases below the target stack supply flow rate if the bypass valve 26 is opened in the control for the cathode system according to the comparative example.

As illustrated in FIG. 9, after the time t4, the difference between the actual stack supply flow rate and the target stack supply flow rate is equal to or less than the predetermined amount, namely, the actual stack supply flow rate becomes less than the target stack supply flow rate if the bypass valve 26 is opened. Thus, when the drive of the bypass valve 26 is inhibited after the time t4, after the time t5, the deviation between the target stack supply flow rate and the actual stack supply flow rate becomes constant in the state where the compressor supply flow rate requested for dilution is set as the target stack supply flow rate, and in the state where the actual stack supply flow rate is more than the target stack supply flow rate.

Then, the calculation of the time integration of the deviation between the target stack supply flow rate and the actual stack supply flow rate is stopped in the PI control of the compressor-supply-flow-amount-requested-by-stack calculation part 103, and thus, the compressor supply flow rate requested by stack becomes constant after the time t5 (FIG. 9(B)). Thus, the compressor supply flow rate requested for dilution remains set at the target stack supply flow rate, and hence the actual stack supply flow rate cannot be controlled to match the target stack supply flow rate.

As described above, if the bypass valve 26 is fixed when the actual stack supply flow rate is more than the target stack supply flow rate, the actual stack supply flow rate cannot be controlled to match the target stack supply flow rate, and the actual stack supply flow rate thus remains more than the target stack supply flow rate. Thus, the electrolyte membrane of each of the fuel cells is brought into an excessively dried state, resulting in a decrease in the power generation efficiency.

In view of this, in this embodiment, the timing of fixing the bypass valve 26 is further finely set so that the actual stack supply flow rate can match the target stack supply flow rate while the bypass valve 26 is inhibited from repeating the opening/closing. Then, the timing of releasing the fixation of the bypass valve 26 is appropriately set. A description is now given of the control for the cathode system according to this embodiment.

Figure 3:
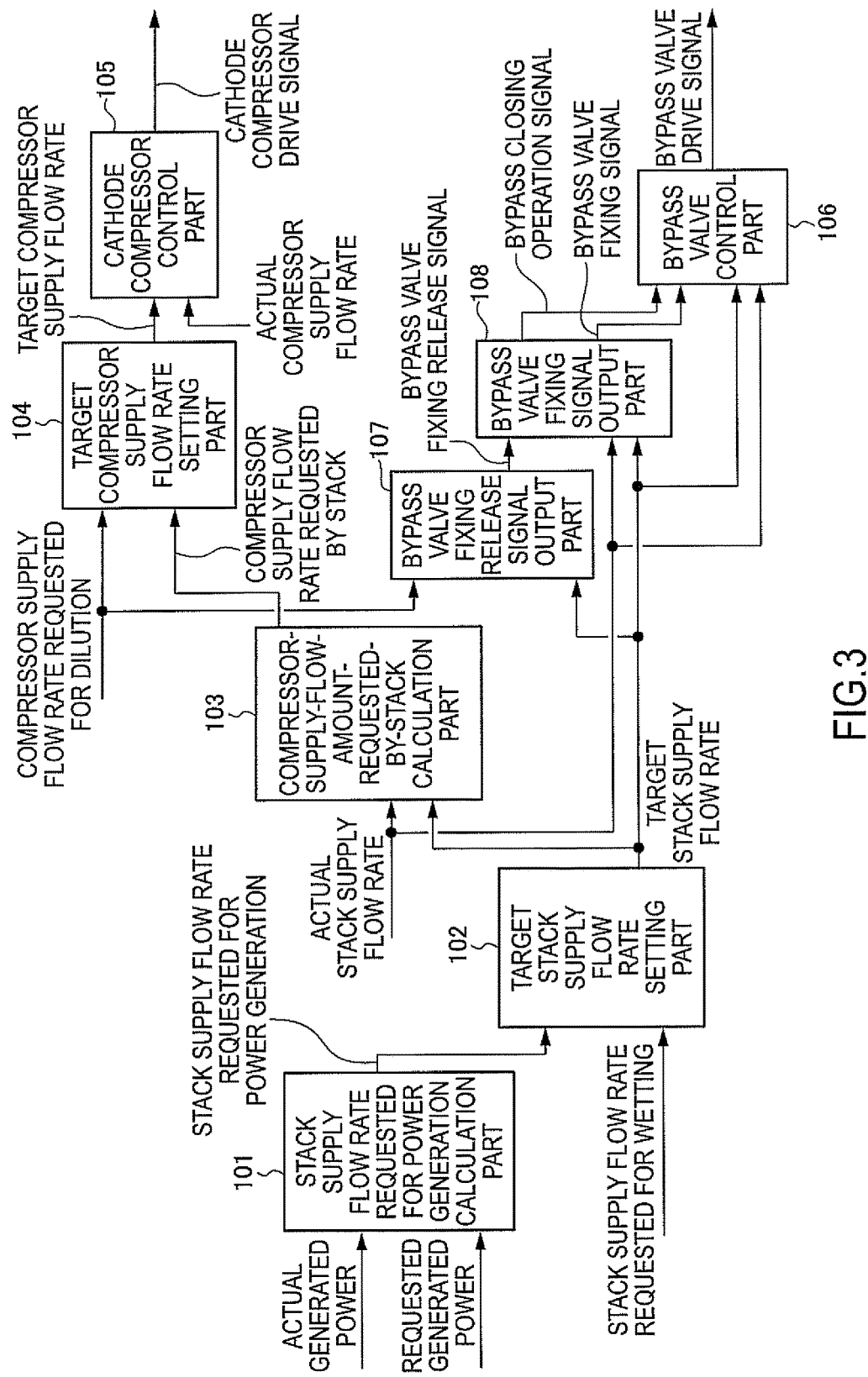
FIG. 3 is a diagram illustrating control blocks of a cathode system according to this embodiment of this invention.

FIG. 3 is a diagram illustrating control blocks of the cathode system according to this embodiment. It should be noted that control blocks of the cathode system according to this embodiment having similar functions as those of the control blocks of the cathode system according to the comparative example are denoted by the same reference numerals, and a redundant description thereof is properly omitted.

The control blocks of the cathode system according to this embodiment further include a bypass valve fixing release signal output part 107 and a bypass valve fixing signal output part 108.

The target stack supply flow rate and the compressor supply flow rate requested for dilution are input to the bypass valve fixing release signal output part 107. The bypass valve fixing release signal output part 107 outputs a bypass valve fixing release signal for releasing the fixation of the bypass valve 26 based on those input signals. Referring to a flowchart of FIG. 4, a description is later given of details of control carried out by the bypass valve fixing release signal output part 107.

The actual stack supply flow rate, the target stack supply flow rate, and the bypass valve fixing release signal are input to the bypass valve fixing signal output part 108. The bypass valve fixing signal output part 108 outputs a bypass valve fixing signal for inhibiting the drive of the bypass valve 26, thereby fixing the bypass valve 26 at a current position, and a bypass valve closing operation signal for fully closing the bypass valve 26 in a compulsory manner based on those input signals. Referring to a flowchart of FIG. 5, a description is later given of details of control carried out by the bypass valve fixing signal output part 108.

Figure 4:
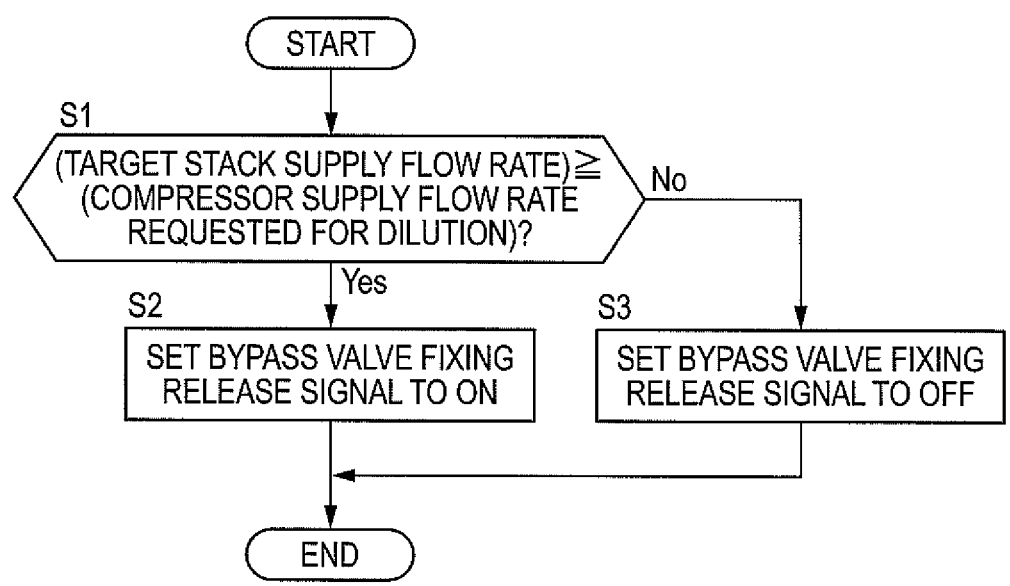
FIG. 4 is a flowchart illustrating details of control carried out by a controller in a bypass valve fixation release signal output part.

FIG. 4 is a flowchart illustrating the details of the control carried out by the bypass valve fixing release signal output part 107.

In Step S1, the controller 4 determines whether the target stack supply flow rate is equal to or more than the compressor supply flow rate requested for dilution or not. When the target stack supply flow rate is equal to or more than the compressor supply flow rate requested for dilution, the controller 4 carries out processing of Step S2. On the other hand, when the target stack supply flow rate is less than the compressor supply flow rate requested for dilution, the controller 4 carries out processing of Step S3.

In Step S2, the controller 4 sets the bypass valve fixing release signal to ON.

In Step S3, the controller 4 sets the bypass valve fixing release signal to OFF.

Figure 5:
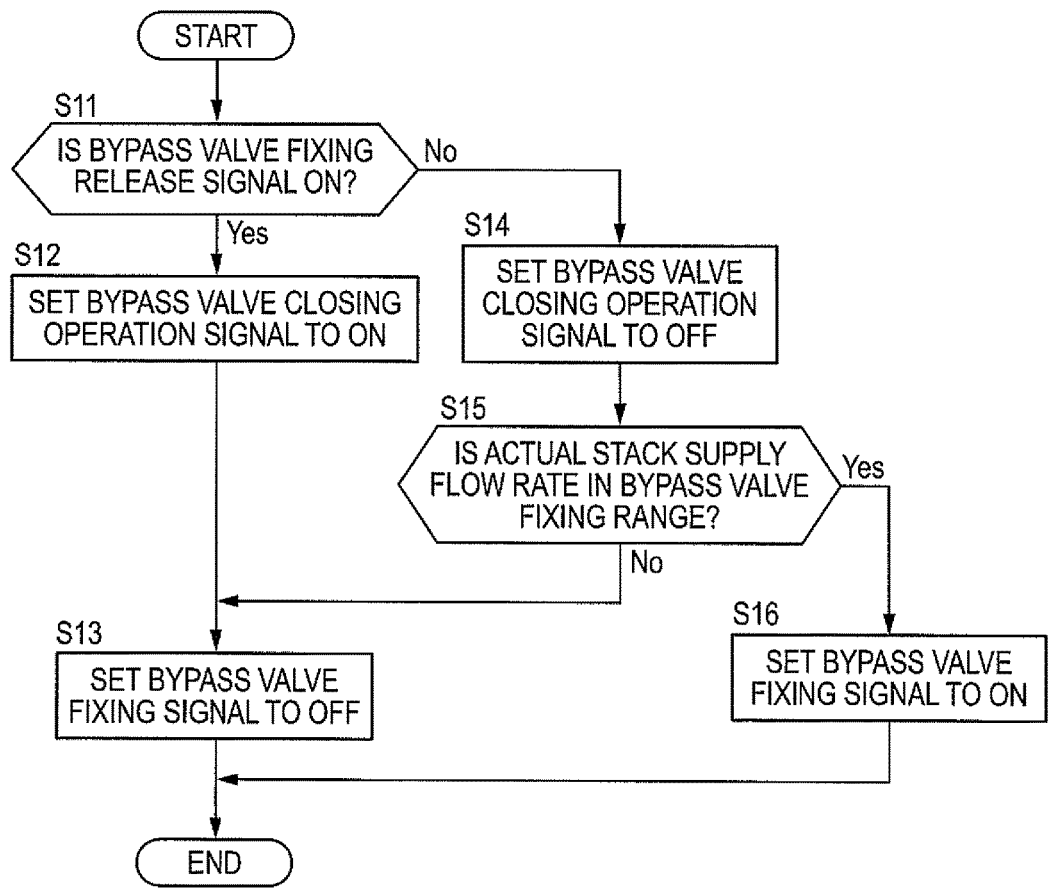
FIG. 5 is a flowchart illustrating details of control carried out by the controller in a bypass valve fixing signal output part.

FIG. 5 is a flowchart illustrating the details of the control carried out provided by the bypass valve fixing signal output part 108.

In Step S11, the controller 4 determines whether the bypass valve fixing release signal is set to ON or not. When the bypass valve fixing release signal is set to ON, the controller 4 carries out processing of Step S12. On the other hand, when the bypass valve fixing release signal is set to OFF, the controller 4 carries out processing of Step S14.

In Step S12, the controller 4 sets the bypass valve closing operation signal to ON regardless of the opening degree of the bypass valve 26. This is because the bypass valve 26 needs to be fully closed when the bypass valve fixing release signal is set to ON, and when the bypass valve closing operation signal is set to ON, a predetermined value for compulsorily closing the bypass valve 26 is input to the deviation used for the PI control of the bypass valve control part 106. After the bypass valve 26 is fully closed, the integral operation of operating the bypass valve 26 toward the close direction is stopped in order to prevent the windup phenomenon in the PI control of the bypass valve control part 106.

As described above, the bypass valve closing operation signal is set to ON in accordance with the setting of the bypass valve fixing release signal to ON, and when the bypass valve fixing release signal is set to ON, the bypass valve 26 can thus be always operated toward the close direction, thereby maintaining the bypass valve 26 in the fully closed state.

In Step S13, the controller 4 sets the bypass valve fixing signal to OFF.

In Step S14, the controller 4 sets the bypass valve closing operation signal to OFF.

In Step S15, the controller 4 determines whether the actual stack supply flow rate is in a bypass valve fixing range or not. The bypass valve fixing range is a range having a flow rate (hereinafter referred to as "fixing range upper limit flow rate") acquired by adding a predetermined value $\alpha$ to the target stack supply flow rate as an upper limit and a flow rate (hereinafter referred to as "fixing range lower limit flow rate") acquired by subtracting a predetermined value $\beta$ from the target stack supply flow rate as a lower limit. It should be noted that the predetermined value $\alpha$ is a minute value set by considering a detection error of the second flow rate sensor 42 for detecting the actual stack supply flow rate, a control error of feedback control, and the like, and the target stack supply flow rate and the fixing range upper limit flow rate thus have values approximately equal to each other. The predetermined value $\beta$ is a value more than the predetermined value $\alpha$, and is set to a value approximately equal to a bypass flow rate corresponding to the unit opening degree of the bypass valve 26. When the actual stack supply flow rate is in the bypass valve fixing range, the controller 4 carries out processing of Step S16. On the other hand, when the actual stack supply flow rate is not in the bypass valve fixing range, the controller 4 carries out processing of Step S13.

In Step S16, the controller 4 sets the bypass valve fixing release signal to ON.

Figure 6:
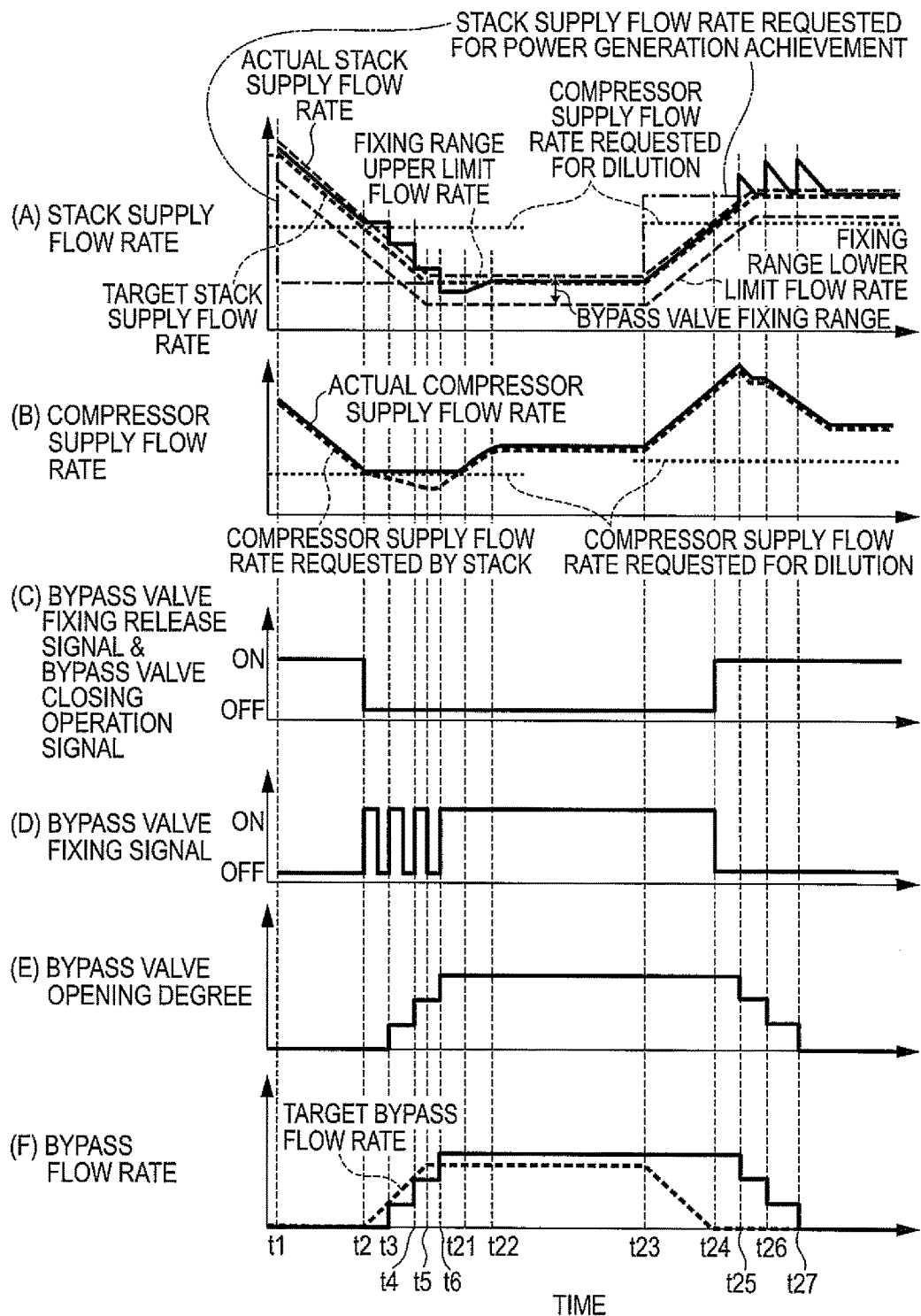
FIG. 6 are time charts illustrating an operation of control for the cathode system according to the embodiment of this invention.

FIG. 6 are time charts illustrating the operation of the control for the cathode system according to the embodiment. In the following, a description is given while also referring to the step numbers in the flowchart of FIG. 5 in order to clarify a correspondence to the flowchart.

The same operation as that of the control for the cathode system according to the comparative example is carried out from the time t1 to the time t6.

When the bypass valve 26 is opened by the unit opening degree at the time t6, the actual stack supply flow rate falls in the bypass valve fixing range. The target stack supply flow rate is less than the compressor supply flow rate requested for dilution at the time t6, and the bypass valve fixing release signal is thus OFF. Therefore, the state where the state where the actual stack supply flow rate falls in the bypass valve fixing range at the time t6 is brought about, and the bypass valve fixing signal is thus set to ON.

On this occasion, the compressor supply flow rate requested for dilution is set as the target compressor supply flow rate and the actual stack supply flow rate is more than the target stack supply flow rate from the time t2 to the time t6, and the PI control of the compressor-supply-flow-amount-requested-by-stack calculation part 103 thus stops the calculation of the time integration of the deviation. Therefore, the compressor supply flow rate requested by stack becomes constant as a result of the state where the difference between the target stack supply flow rate and the actual stack supply flow rate becomes constant at the time t5 (FIG. 6(B)).

Then, when the bypass valve 26 is opened by the unit opening degree at the time t6, and the actual stack supply flow rate decreases below the target stack supply flow rate, the PI control of the compressor-supply-flow-amount-requested-by-stack calculation part 103 thus resumes the calculation of the time integration of the deviation. As a result, the compressor supply flow rate requested by stack gradually increases after the time t6 (FIG. 6(B)).

Then, when the compressor supply flow rate requested by stack increases above the compressor supply flow rate requested for dilution at a time t21, the compressor supply flow rate requested by stack is set as the target compressor supply flow rate.

Even after the compressor supply flow rate requested by stack is set as the target compressor supply flow rate at the time t21, the actual stack supply flow rate is less than the target stack supply flow rate (FIG. 6(A)), and the compressor supply flow rate requested by stack thus increases, and the target compressor supply flow rate accordingly increases. As a result, the actual stack supply flow rate increases as the target compressor supply flow rate increases (FIG. 6(A)).

As a result, the actual stack supply flow rate can be increased to the target stack supply flow rate at a time t22. Then, until the requested generated power for the fuel cell stack changes at a time t23 (FIG. 6(A)), while the opening degree of the bypass valve 26 is fixed (FIGS. 6(D) and (E)), the actual stack supply flow rate is maintained to the target stack supply flow rate (FIG. 6(A)).

At the time t23, for example, when the accelerator operation amount increases, the requested generated power increases as a result, and the stack supply flow rate requested for power generation achievement accordingly increases, the target stack supply flow rate increases toward the stack supply flow rate requested for power generation achievement (FIG. 6(A)). As a result, the compressor supply flow rate requested by stack also increases (FIG. 6(B)).

The compressor supply flow rate requested by stack is more than the compressor supply flow rate requested for dilution at the time t23, and the compressor supply flow rate requested by stack is thus set as the target compressor supply flow rate. As a result, the responsive cathode compressor is controlled so as to control the actual compressor supply flow rate to reach the compressor supply flow rate requested by stack, and the actual stack supply flow rate increases approximately following the target stack supply flow rate. As a result, the actual stack supply flow rate remains in the bypass valve fixing range (FIG. 6(A)).

Then, even after the target stack supply flow rate (stack supply flow rate requested for power generation) is more than the compressor supply flow rate requested for dilution at a time t24, and the state where the bypass valve 26 can be fully closed is thus brought about, the bypass valve 26 cannot be closed. If the bypass valve 26 remains opened even after the state where the bypass valve 26 can be closed is brought about in this way, the compressor supply flow rate wastefully increases by a corresponding amount, resulting in degradation in fuel efficiency.

In view of this, in this embodiment, when the target stack supply flow rate becomes more than the compressor supply flow rate requested for dilution, the bypass valve fixing release signal and the bypass valve closing operation signal are set to ON, thereby enabling the bypass valve 26 to be closed even when the actual stack supply flow rate is in the bypass valve fixing range.

At a time t24, when the target stack supply flow rate becomes more than the compressor supply flow rate requested for dilution (FIG. 6(A)), and the bypass valve fixing release signal is set to ON, the bypass valve closing operation signal is set to ON, and the bypass valve fixing signal is set to OFF (FIGS. 6(C) and (D); YES in S11, S12, and S13). In this way, the close side bypass valve operation amount calculated by the bypass valve control part 106 is increased as a result of the bypass valve closing operation signal set to ON.

When the close side bypass valve operation amount exceeds the predetermined amount, and the bypass valve 26 is closed by the unit opening degree at a time t25, the actual stack supply flow rate becomes more than the target stack supply flow rate (FIG. 6(A)). As a result, after the time t25, the compressor supply flow rate requested by stack decreases (FIG. 6(B)), and the actual stack supply flow rate also decreases (FIG. 6(A)).

Even after the bypass valve 26 is closed at the time t25, the opening degree of the bypass valve 26 is not fully closed, and the close operation thus continues at a time t26 (FIG. 6(E)). In this way, the actual stack supply flow rate increases above the target stack supply flow rate (FIG. 6(A)). As a result, the compressor supply flow rate requested by stack decreases (FIG. 6(B)), and the actual stack supply flow rate also decreases (FIG. 6(A)). Similarly, at a time t27, the bypass valve 26 is closed, and the bypass valve 26 is fully closed (FIG. 6(E)).

According to this embodiment described above, after the target stack supply flow rate decreases below the compressor supply flow rate requested for dilution, and the bypass valve fixing release signal is set to OFF, the bypass valve 26 is fixed when the bypass valve 26 stepwise opens and the actual stack supply flow rate decreases below the target stack supply flow rate.

In this way, the bypass valve 26 is prevented from repeating opening/closing, and the actual compressor supply flow rate can thus be prevented from fluctuating upward/downward around the target compressor supply flow rate. As a result, the noise can be prevented from being generated from the cathode compressor 22. Moreover, the bypass valve 26 is fixed after the actual stack supply flow rate decreases below the target stack supply flow rate, and the electrolyte membranes can thus be prevented from being excessively dried.

Moreover, in this embodiment, if the compressor supply flow rate requested for dilution is set as the target compressor supply flow rate in the target compressor supply flow rate setting part 104 in order to prevent the windup phenomena, only when the actual stack supply flow rate is less than the target stack supply flow rate (only when the compressor supply flow rate requested by stack needs to be increased), the time integration of the difference between the target stack flow rate and the actual stack flow rate is carried out in the compressor-supply-flow-amount-requested-by-stack calculation part 103. Then, when the actual stack supply flow rate is more than the target stack supply flow rate (when the compressor supply flow rate requested by stack needs to be reduced), the time integration of the difference between the target stack flow rate and the actual stack flow rate is stopped.

As a result, if the drive of the bypass valve 26 is inhibited in the state where the actual stack supply flow rate is more than the target stack supply flow rate, when the difference between the actual stack supply flow rate and the target stack supply flow rate becomes constant as a result of the inhibition of the drive of the bypass valve 26, the time integration of the deviation is stopped, and the actual stack supply flow rate cannot be controlled to match the target stack supply flow rate.

In contrast, in this embodiment, the bypass valve 26 is inhibited from being driven after the actual stack supply flow rate decreases below the target stack supply flow rate, and even when the difference between the actual stack supply flow rate and the target stack supply flow rate becomes constant, the time integration of the difference can be carried out. Therefore, the compressor supply flow rate requested by stack can be increased so that the actual stack supply flow rate matches the target stack supply flow rate. Thus, the electrolyte membrane of each of the fuel cells is prevented from being excessively dried, and the power generation efficiency can thus be prevented from decreasing.

Moreover, in this embodiment, when the target stack supply flow rate becomes more than the compressor supply flow rate requested for dilution, the bypass valve fixing release signal and the bypass valve closing operation signal are set to ON, thereby enabling the bypass valve 26 to be closed even when the actual stack supply flow rate is in the bypass valve fixing range.

In this way, after the bypass valve 26 is fixed, and the actual stack supply flow rate is controlled to match the target stack supply flow rate, the state where the bypass valve 26 cannot be closed even when the bypass valve 26 can be fully closed can be prevented from occurring. As a result, the compressor supply flow rate does not wastefully increase, and the degradation in fuel efficiency can thus be prevented.

Though a description has been given of the embodiment of this invention, the embodiment describes only a part of application examples of this invention, and is not intended to limit the technical scope of this invention to the specific configurations of the above-mentioned embodiment.

In the embodiment described above, the bypass valve 26 is closed by the unit opening degree when the target stack supply flow rate becomes more than the compressor supply flow rate requested for dilution, but the bypass valve 26 may be controlled to be fully closed.

Moreover, in the embodiment described above, the stack supply flow rate requested for power generation and the stack supply flow rate requested for wetting are input to the target stack supply flow rate setting part 102, but a stack supply flow rate for flooding prevention, which is determined depending on the load on the fuel cell stack 1, may be additionally input, and the largest value thereof may be used as the target stack supply flow rate.

Moreover, in the embodiment described above, the compressor supply flow rate requested for dilution and the compressor supply flow rate requested by stack are input to the target compressor supply flow rate setting part 104, but a compressor supply flow rate for surging prevention for the cathode compressor 22 may be additionally input, and the largest value thereof may be used as the target compressor supply flow rate.

Moreover, in the embodiment described above, the feedback control based on the target compressor supply flow rate and the actual compressor supply flow rate is carried out in the cathode compressor control part 105, but feed forward control based on the target compressor supply flow rate may be carried out.

The invention claimed is:

1. A fuel cell system, comprising:
a cathode gas supply passage configured to supply a fuel cell stack with a cathode gas;
a cathode gas discharge passage configured to discharge the cathode gas supplied to the fuel cell stack;
a compressor provided in the cathode gas supply passage;
a bypass passage configured to discharge a part of the cathode gas discharged from the compressor to the cathode gas discharge passage while controlling the part of the cathode gas to bypass the fuel cell stack;
a bypass valve that is provided in the bypass passage and that is configured to adjust a flow rate of the cathode gas flowing through the bypass passage in a stepwise manner;
a stack supply flow rate sensor that detects a stack supply flow rate supplied to the fuel cell stack;
a controller operable to:
calculate a target stack supply flow rate to be supplied to the fuel cell stack based on a request from the fuel cell stack;
calculate a compressor supply flow rate requested by the fuel cell stack for controlling the stack supply flow rate to reach the target stack supply flow rate based on the stack supply flow rate and the target stack supply flow rate;
set a larger one of the compressor supply flow rate requested by stack and a lower limit flow rate, which is determined depending on a request from the fuel cell system, as a target compressor supply flow rate, which is a target value of the compressor supply flow rate;
control the compressor depending on the target compressor supply flow rate;
control the bypass valve based on the stack supply flow rate and the target stack supply flow rate;
change a position of the bypass valve until the stack supply flow rate reaches a bypass valve fixing range, the bypass valve fixing range being determined so as to suppress a repetition of a closing/opening of the bypass valve on the basis of the target stack supply flow rate;
fix the bypass valve so that a position of the bypass valve is not changed when the stack supply flow rate becomes less than the target stack supply flow rate in the bypass valve fixing range;
allow change in the position of the bypass valve when the target compressor supply flow rate becomes more than the lower limit flow rate after the position of the bypass valve is fixed.

2. The fuel cell system according to claim 1, wherein when the position of the bypass valve is allowed to change by the controller, the bypass valve is closed by a unit opening degree.

3. The fuel cell system according to claim 1, wherein when the position of the bypass valve is allowed to change by the controller, the bypass valve is fully closed.

4. The fuel cell system according to claim 1, wherein in a case where the target compressor supply flow rate is restricted to the lower limit flow rate, only when the stack supply flow rate is less than the target stack supply flow rate, the controller carries out feedback control of calculating a time integration of a difference between the stack supply flow rate and the target stack supply flow rate, thereby calculating the compressor supply flow rate requested by stack.

5. The fuel cell system according to claim 1, further comprising an anode gas discharge passage configured to discharge an anode gas discharged from the fuel cell stack to the cathode gas discharge passage,
wherein the lower limit flow rate comprises a target value of a compressor supply flow rate required for reducing a hydrogen density in the cathode gas discharge passage to a predetermined value or less.

6. The fuel cell system according to claim 1, wherein the bypass valve fixing range comprises a range of from a restricted range lower limit flow rate, which is acquired by subtracting a predetermined value $\beta$ from the target stack supply flow rate, to a restricted range upper limit flow rate, which is acquired by adding a predetermined value $\alpha$ to the target stack supply flow rate.

* * * * *